US007234778B1

(12) United States Patent
Toba

(10) Patent No.: US 7,234,778 B1
(45) Date of Patent: Jun. 26, 2007

(54) RETRACTABLE HEADREST FOR VEHICLE

(75) Inventor: Eiji Toba, Tochigi-ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 11/295,814

(22) Filed: Dec. 7, 2005

(51) Int. Cl.
*A47C 7/36* (2006.01)

(52) U.S. Cl. ...................................... 297/403; 297/408

(58) Field of Classification Search ................ 297/403, 297/408
See application file for complete search history.

(56) References Cited

U.S. PATENT DOCUMENTS 4,711,494 A 12/1987 Duvenkamp
6,612,653 B2 * 9/2003 Takata .................... 297/408 X
6,957,858 B2 * 10/2005 Yetukuri et al. ........ 297/408 X

FOREIGN PATENT DOCUMENTS

JP 5-53559 7/1993

* cited by examiner

*Primary Examiner*—Anthony D Barfield
(74) *Attorney, Agent, or Firm*—Akerman Senterfitt

(57) ABSTRACT

A retractable headrest for vehicle having a general versatility. All the components of a retracting mechanism for retracting a headrest body are provided inside the headrest body. Thus, any additional component does not need to be provided inside a seatback. Accordingly, even if the seatback can take various forms according to the type of a vehicle, yet the headrest body can be made retractable by an actuator simply by attaching the headrest to an upper portion of the seatback, using a pillar. Thus way, there can be provided a retractable headrest for vehicle with a high versatility.

16 Claims, 17 Drawing Sheets

RETRACTABLE HEADREST FOR VEHICLE

BACKGROUND OF INVENTION

1. Field of the Invention

The present invention relates to a retractable headrest for vehicle, preferably to one provided on a top side of a rear seatback.

2. Related Prior Art

Conventionally, an electrically-powered retractable headrest for vehicle has been disclosed in for example Japanese un-examined utility model publication No. 5-53559, proposing a structure of a headrest such that the headrest body provided on a upper portion of a seatback is retracted backward to prevent the headrest body from protruding from the upper portion of the seatback.

According to the conventional retractable headrest using such electrically-powered retractable headrest structure, however, respective parts of so-called retracting mechanism need to be arranged inside a seatback according to a specific shape thereof designed according to a variety of types of vehicle, so that it has been impossible to provide a headrest retractable structure having general versatility.

SUMMARY OF THE INVENTION

To eliminate the above problem, it is, therefore, an object of the present invention to provide a retractable headrest for vehicle having general versatility.

According to a first aspect of the present invention, there is provided a retractable headrest for vehicle including a pillar having a horizontal shaft, the pillar being provided in an upper potion of a seatback; a headrest body having a lower portion rotatably provided around the horizontal shaft of the pillar; and a retracting mechanism for retracing the headrest body backward, the retracting mechanism being provided inside the headrest body, and comprising:

a headrest body biasing means for biasing an upper portion of the headrest body backward;

a lock plate provided on the horizontal shaft of the pillar, the lock plate having a first locking part;

a latch provided in the headrest body, the latch having a second locking part engageable with the first locking part;

a latch biasing means for biasing the latch so as to engage the second locking part with the first locking part of the lock plate when the headrest body is erected in a substantially vertical state; and an actuator for disengaging the second locking part of the latch from the first locking part of the lock plate against a basing force from the latch biasing means.

Thus, since all the components of the retracting mechanism for retracting the headrest body are provided inside the headrest body, any additional component does not need to be provided inside a seatback. Accordingly, even if the seatback can take various forms according to the type of a vehicle, yet the headrest body can be made retractable by the actuator simply by attaching the headrest to an upper portion of the seatback, via the pillar. Thus way, there can be provided a retractable headrest for vehicle with a high versatility.

According to a second aspect of the present invention, there is provided a retractable headrest for vehicle set forth in the first aspect, wherein the actuator includes: a motor driven in response to a command from an operation part; a rack to which a driving force from the motor is transmitted; and an arm for disengaging the second locking part of the latch from the first locking part of the lock plate in response to a sliding action of the rack.

Accordingly, the headrest body 7A can be retracted backward by remote control without a passenger directly touching the same, and thus range of vision can be extended easily, thus enabling the improvement of driving security reliably and easily.

According to a third aspect of the present invention, there is provided a retractable headrest for vehicle set forth in either of the foregoing aspects, wherein the headrest body is arranged in a concave portion formed in an upper portion of the seatback, while the pillar allows the horizontal shaft to protrude from the sides of the headrest body, extending through opposite surfaces of the concave portion and attached to a seatback frame provided inside the seatback.

Accordingly, the pillar that supports the headrest body can be hidden so as to be made invisible. As a result, the unity between the seatback and the headrest body can be realized such that the headrest body, though it is provided with the retracting mechanism, looks as if it were an ordinary headrest body that is normally attached to the seatback. Moreover, since the headrest body is arranged in the concave portion, a cushion pad can be arranged in any part contacted by a back of the passenger's head, thus enabling the provision of the rear seat that is easy for the passenger to take even when there is installed the retractable headrest for vehicle.

According to a fourth aspect of the present invention, there is provided a retractable headrest for vehicle set forth in the third aspect, wherein the headrest body is accommodated into the concave portion by being retracted backward such that the upper portion of the headrest body is substantially aligned with the upper portion of the seatback.

Thus, the upper portion of the seatback is capable of being formed planar as a whole, thereby enabling the rearward visibility to be extended still further. Moreover, since the upper portion of the seatback can be formed substantially planar in this way, the seatback can be folded without the headrest body interfering with a front seat. In addition, there can be saved such a troublesome labor as the folding of the seat forward after detaching the headrest body, thus improving the user-friendliness thereof.

BRIEF DESCRIPTION OF THE DRAWINGS

The invention will be more readily understood by reference to the following description, taken with the accompanying drawings, in which.

DETAILED DESCRIPTION OF THE INVENTION

Next is a detailed description of preferred embodiments of the invention with reference to the appended drawings.

Figure 1:
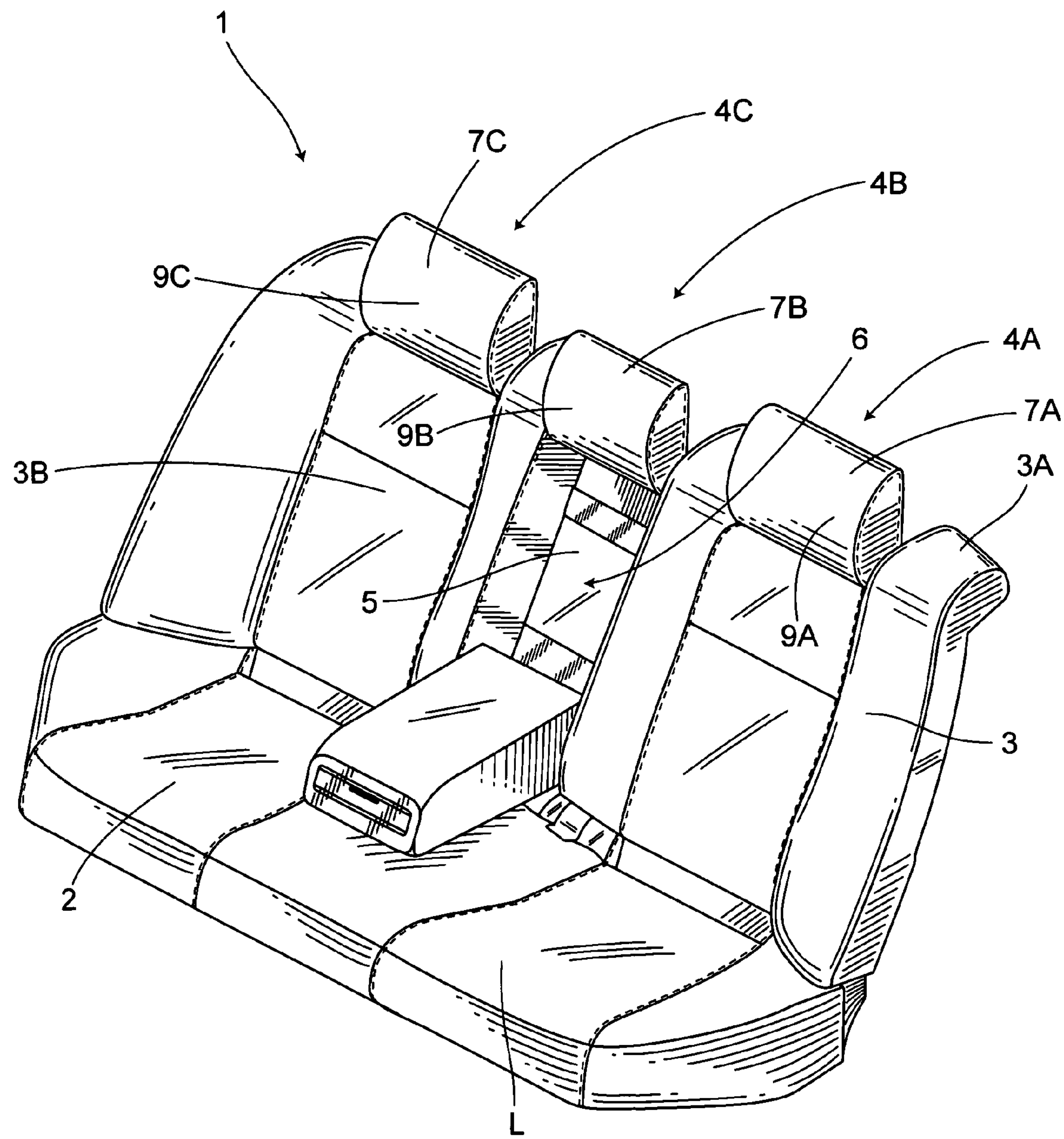
FIG. 1 is a perspective view showing an overall structure of a rear seat of a vehicle.
Figure 2:
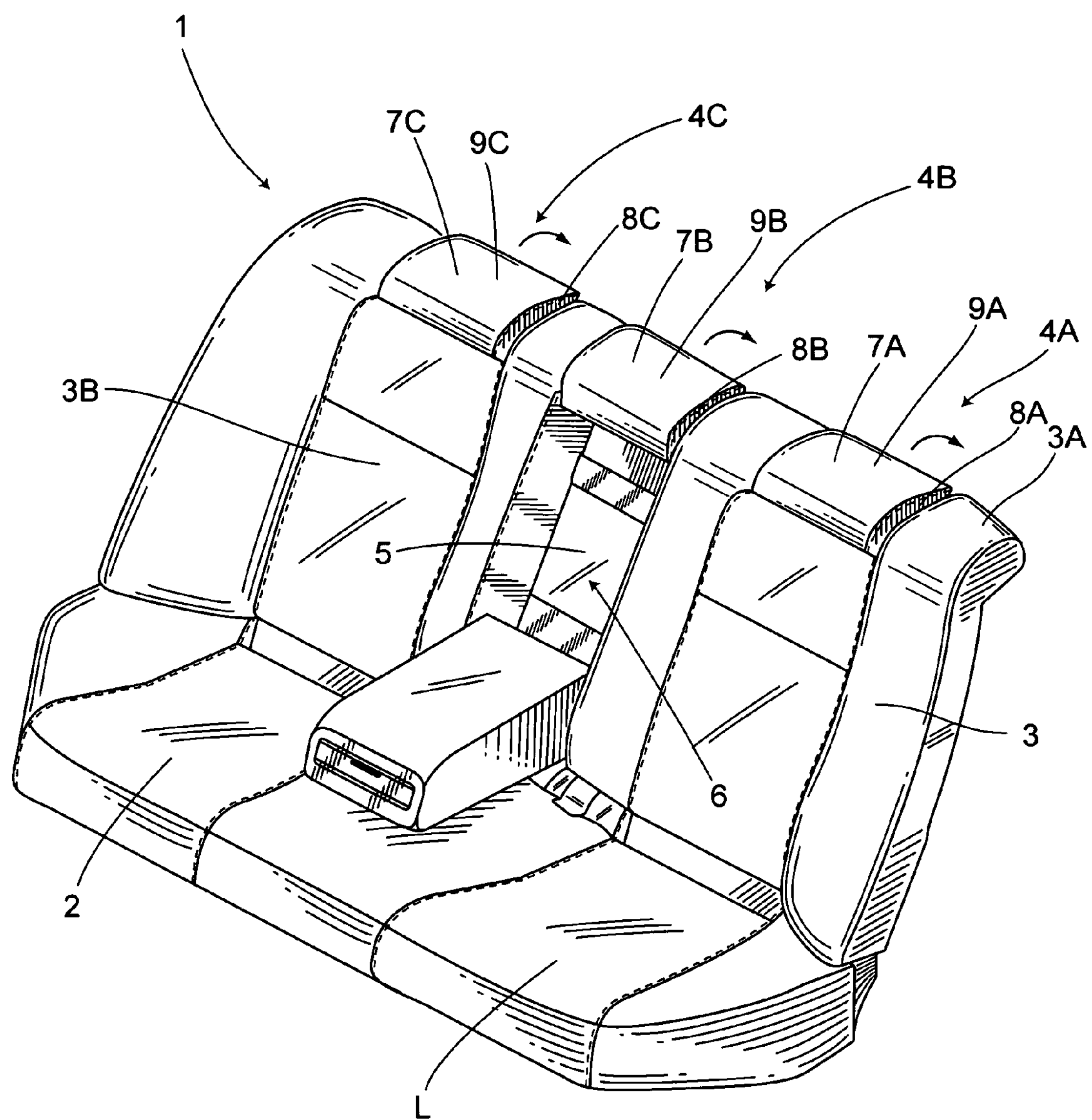
FIG. 2 is another perspective view showing the rear seat with a headrest body being retracted.

In FIG. 1, reference numeral 1 designates a rear seat for vehicle as a whole, comprising: a seat cushion 2; a seatback 3; retractable headrests 4A, 4B and 4C for use in vehicle arranged on an upper portion 3A of the seatback 3, each retractable headrest being composed of a frame (not shown) and a cushion pad attached thereto, being covered with leather L.

The seatback 3 includes a trunk-through 5 which provides a through-opening approximately in the center of the seatback 3, said through-opening being openable and closable by a trunk-through openable and closable device 6 provided in the trunk-through 5. The retractable headrests 4A, 4B and 4C for vehicle are arranged on the top, left and right sides of the trunk-through openable and closable device 6, respectively.

The retractable headrests 4A, 4B and 4C have headrests 7A, 7B and 7C exposed to the outside on the upper portion 3A of the seatback 3 so that the lower sides of the headrests 7A, 7B and 7C are rotatable, while the upper sides thereof are retractable backward, thereby enabling the headrests 7A, 7B and 7C to be accommodated into concave portions 8A, 8B and 8C formed on the upper portion 3A of the seatback 3, respectively, whereby the upper portion 3A of the seatback 3 can be in the same plane as front surfaces 9A, 9*b* and 9C of the headrests 7A, 7B and 7C.

Hereinbelow will be described the headrest 4A only for the simplicity of explanation, since the retractable headrests 4A, 4B and 4C have the same structure.

Figure 3:
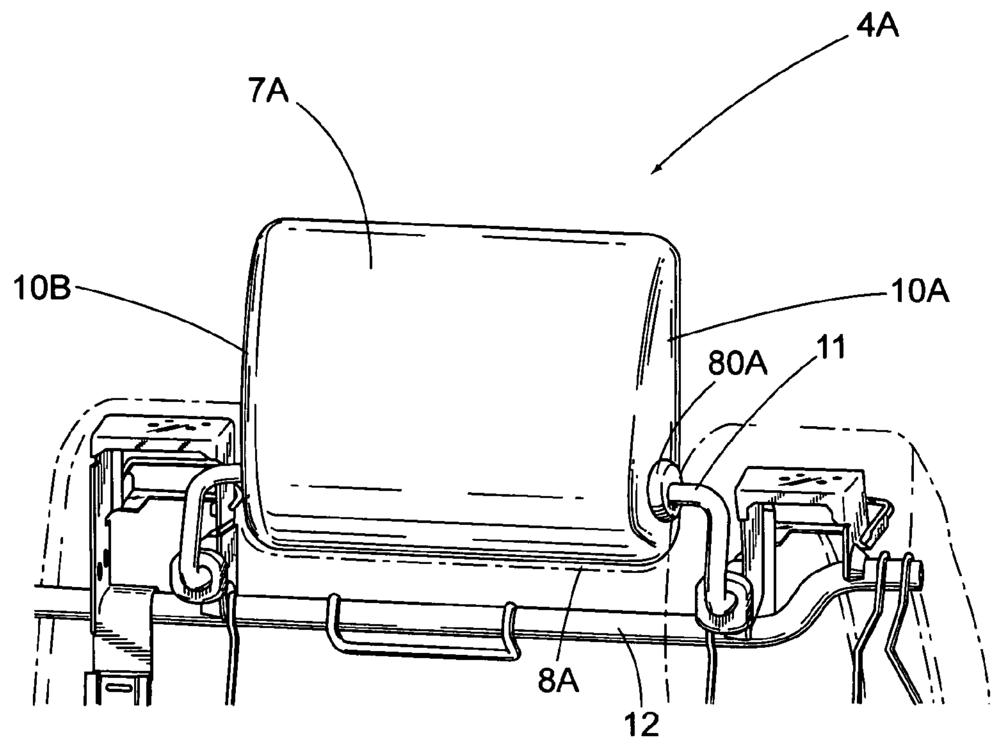
FIG. 3 is a partially cutaway perspective view showing the headrest body being supported by a seatback frame.

As shown in FIG. 3, the retractable headrest 4A includes the headrest body 7A accommodated into the concave portion 8A formed on the upper portion 3A of the seatback 3, while the pillar protruding from the sides 10A and 10B of the headrest body 7A is attached to a seatback frame 12 provided inside the seatback 3, thereby supporting the headrest body 7A by the seatback 3.

Figure 4:
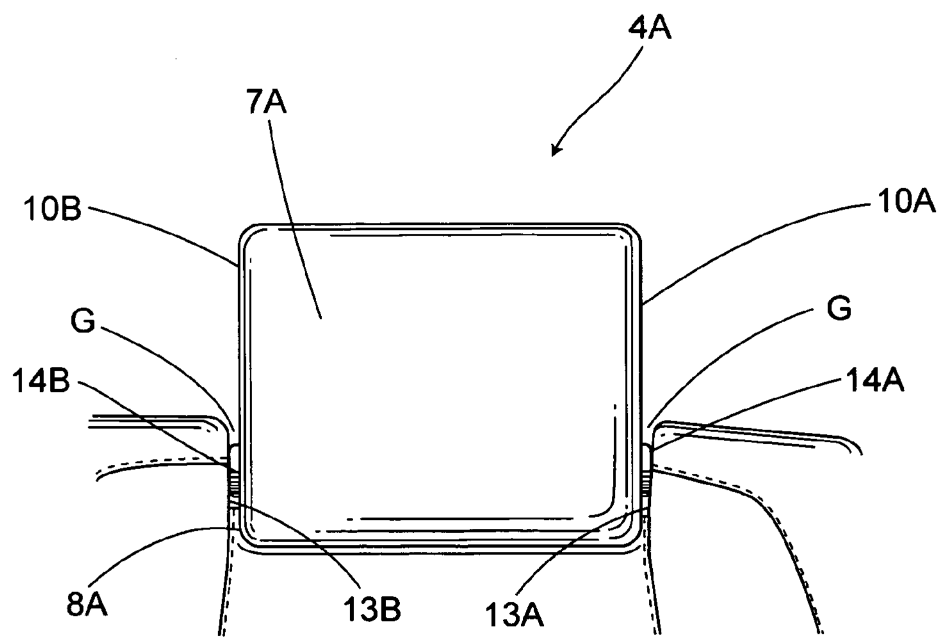
FIG. 4 is a schematic section showing a detailed structure of a concave portion provided on a upper portion of the seatback.

As shown in FIG. 4, the retractable headrest 4A has a slight clearance C between the side surface 10A of the headrest body 7A and a side surface 13A of the concave portion 8A, as well as between the side surface 10B of the headrest body 7A and a side surface 13B of the concave portion 8A. At the same time, end portions of pillar covers 14A and 14B which are made of synthetic resin material and provided on the side surfaces 10A and 10B, respectively, are brought into contact with the side surfaces 13A, 13B, respectively.

Figure 5:
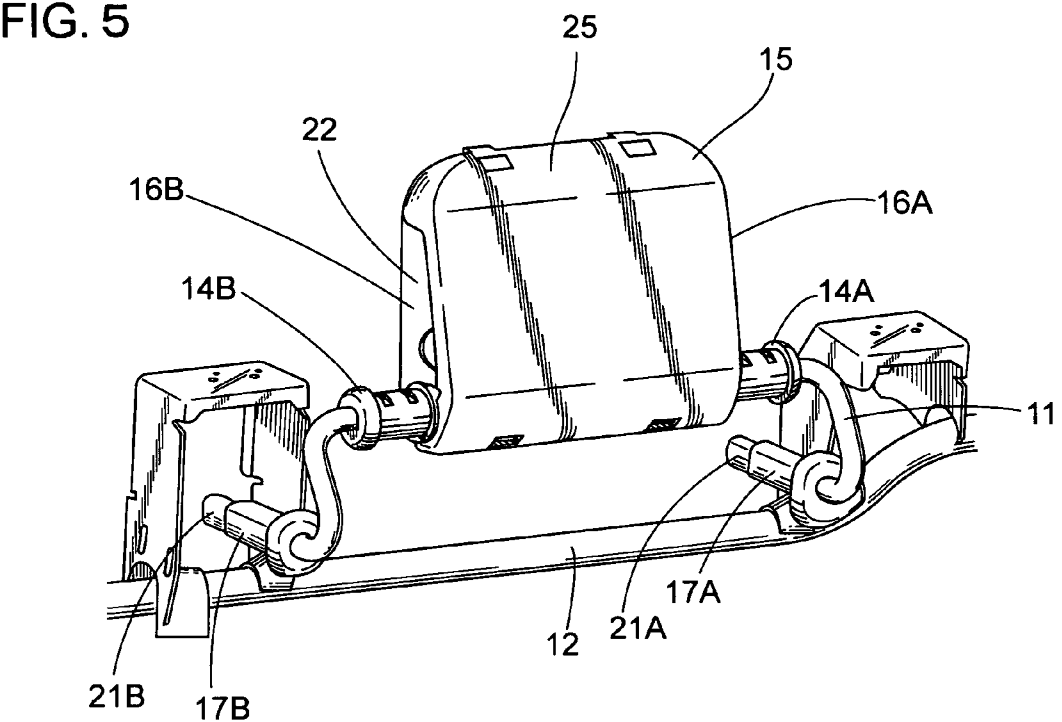
FIG. 5 is a schematic section showing a headrest casing being supported by the seatback frame.

The headrest 7A includes a headrest casing 15 inside the cushion pad, as shown in FIG. 5. The headrest casing 15 has side surfaces 16A, 16B provided with the pillar covers 14A, 14B, respectively, while the pillar 11 protruding from the pillar covers 14A, 14B are supported by being fitted into cylindrical pillar receiving units 17A, 17B provided at the corners of the concave portion 8A of the seatback 3.

Figure 6:
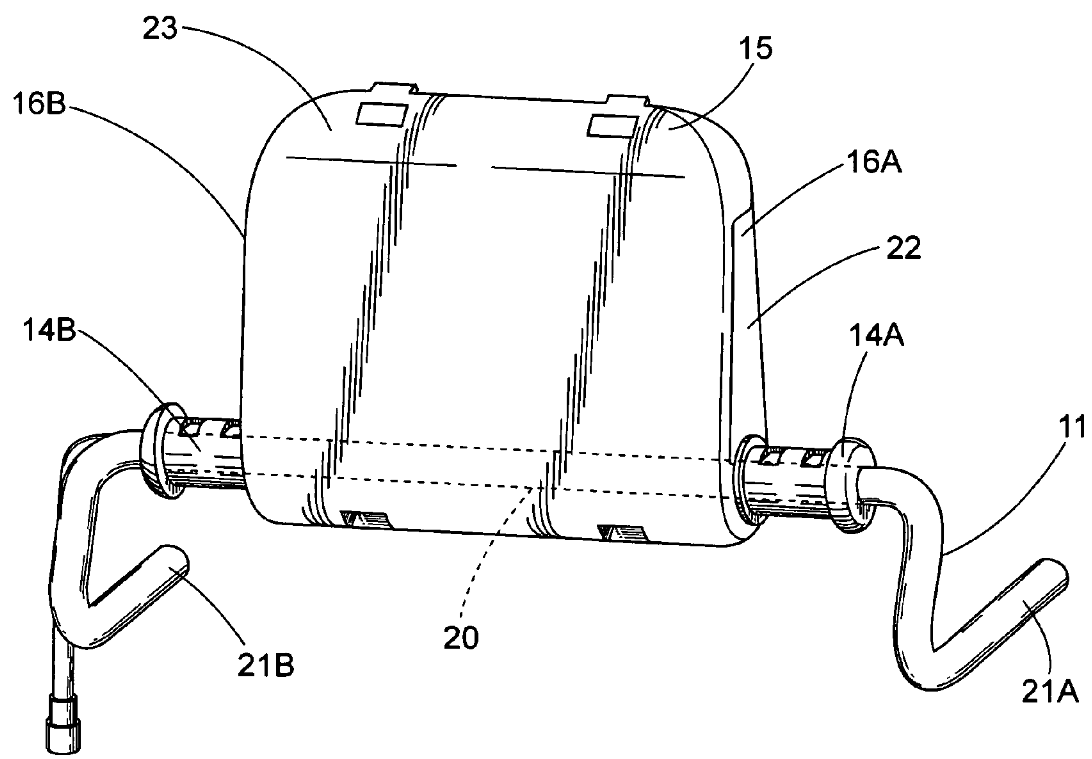
FIG. 6 is a perspective view showing an overall structure of a pillar.

The pillar 11 fitted into the cylindrical receiving units 17A, 17B are made of metal. As shown in FIG. 6, the underside of the headrest casing 15 is rotatably supported by a horizontal shaft 20, while end portions 21A, 21B extending from both sides of the horizontal shaft 20 are allowed to protrude from the pillar covers 14A, 14B, and then to extend backward after being curved substantially vertically.

The headrest casing 15 comprises a first casing 22 that is made of metal and provided rotatably relative to the pillar 11, and a second casing 23 that is made of synthetic resin and fitted into the first casing 22.

Figure 7:
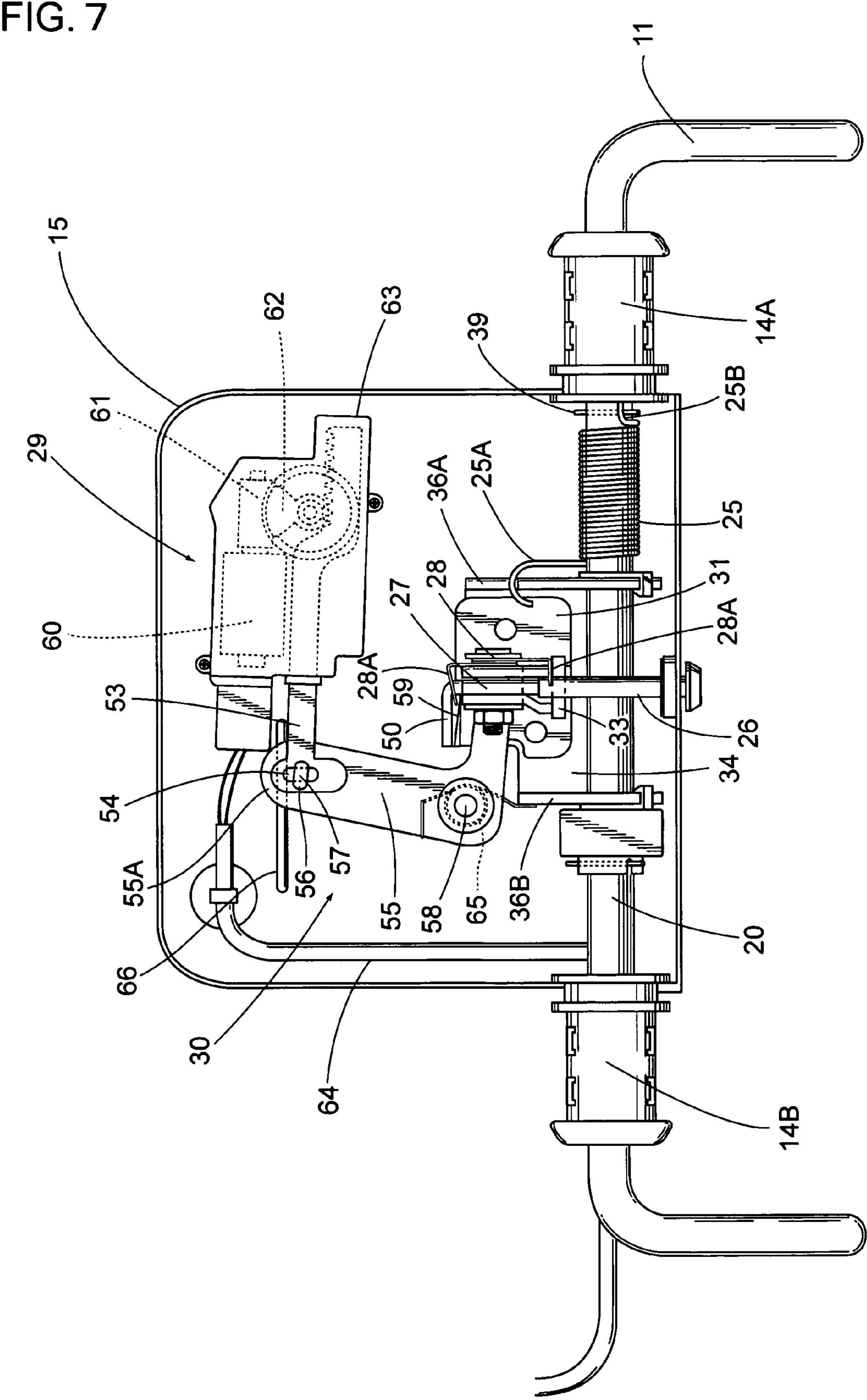
FIG. 7 is a schematic view showing an interior structure of the headrest body.

In addition to the foregoing structure, the headrest casing 15 is provided with a built-in retracting mechanism 30 including: a backward-retracting torsion coil spring 25 for biasing the upper portion of the headrest body 7A backward; a lock plate 26; a latch 27 that engages with the lock plate 26; another torsion coil spring 28 for basing the latch 27; and an actuator 29 for disengaging the latch 27 from the lock plate 26, as shown in FIG. 7. Thus, the headrest casing 15 in an erected state, for example, can be retracted backward by the retracting mechanism 30 in response to the holding down of an operation switch (not shown) provided on a front panel.

In the preferred embodiment, the lock plate 26 serving to keep the headrest casing 15 in an erected state is fixed to the horizontal shaft 20 of the pillar 11 substantially in the center thereof.

Figure 8:
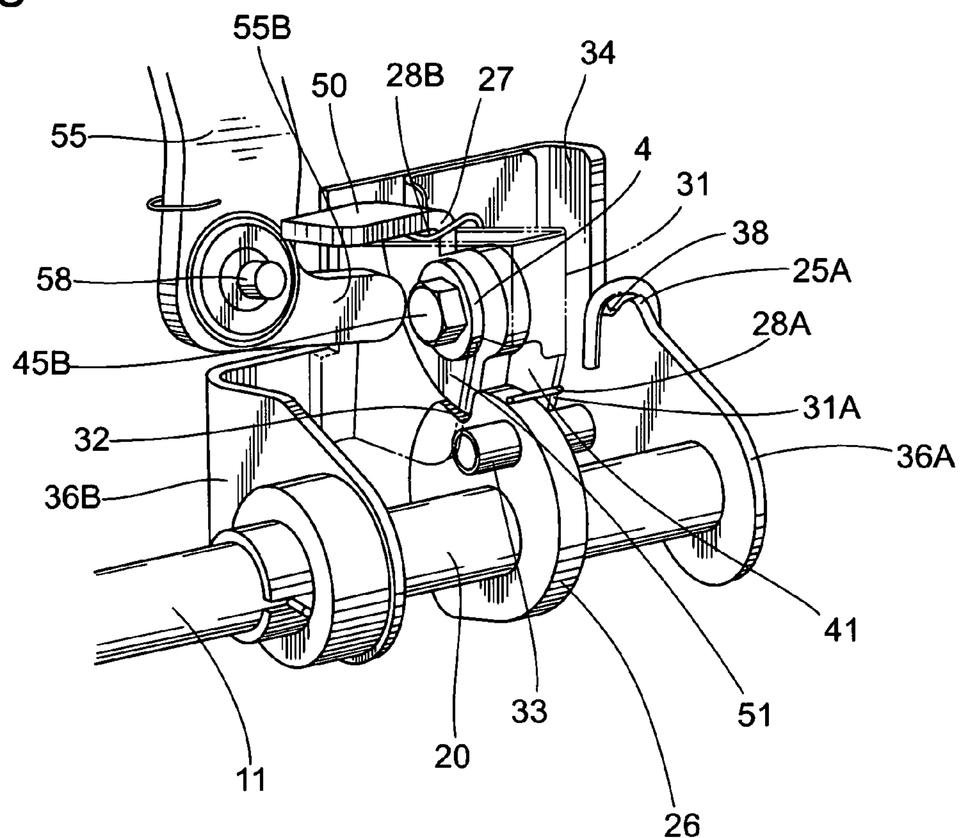
FIG. 8 is a detail view showing a lock plate and a latch in a locked condition.

The lock plate 26, as shown in FIG. 8, is formed with a cutout 32 on an upper portion thereof, said cutout 32 serving to lock the latch 27 rotatably provided on a latch bracket 31, while the lock plate 26 is provided with a cylindrical stopper 33 provided above the pillar 11 and forward of the said cutout 32 in a manner penetrating the same.

Incidentally, the stopper 33 is capable of regulating the rotation of the positive rotation of the headrest body 7A, due to the latch bracket 31 abutting to the same, when the headrest body 7A is in an erected state.

Moreover, the horizontal shaft 20 of the pillar 11 rotatably supports the pillar bearing 34 fixed to the inside of the first casing 22 at both sides across the lock plate 26.

Figure 9:
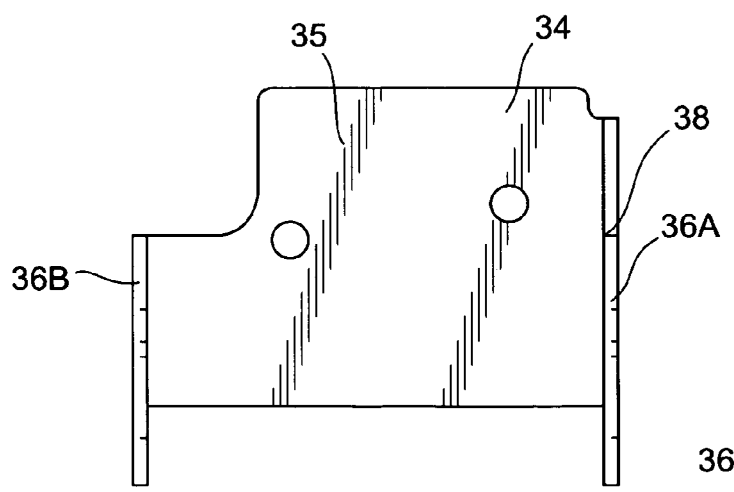
FIGS. 9(A) and 9(B) are schematic views showing front and side structures of a pillar bearing, respectively.
Figure 9:
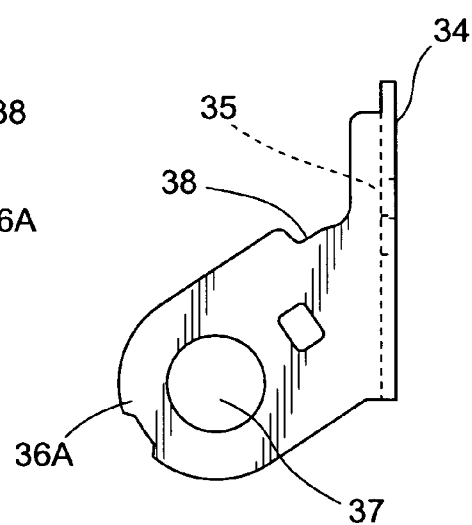

More specifically, as shown in FIGS. 9(A) and 9(B), the pillar bearing 34 is formed such that a planar portion 35 can be fixed to the inner surface of the first casing 22, while both sides of the planar portion 35 are bent substantially perpendicularly to thereby form bent portions 36A and 36B, said bent portions 36A and 36B having through-holes 37 formed therethrough, respectively so that the horizontal shaft 20 of the pillar 11 is inserted therethrough.

The pillar bearing 34 is formed with a spring fastening part 38 on a top side of the aforesaid bent portion 36A, thus enabling the fastening of the end 25A of the backward-retracting torsion coil spring 25 provided in the horizontal shaft 20.

The backward-retracting torsion coil spring 25, as is illustrated in FIG. 7, is inserted from the one side of the horizontal shaft 20, and the opposite end 25B thereof is fastened by the lock pin 39 projected at the one side of the horizontal shaft 20, so that the a load may be given in the direction which rewinds the backward-retracting torsion coil spring 25.

The backward-retracting torsion coil spring 25 serves to always give to the first casing 22 a load to retract the upper portion of the headrest body 7A backward via the pillar bearing 34.

Figure 10A:
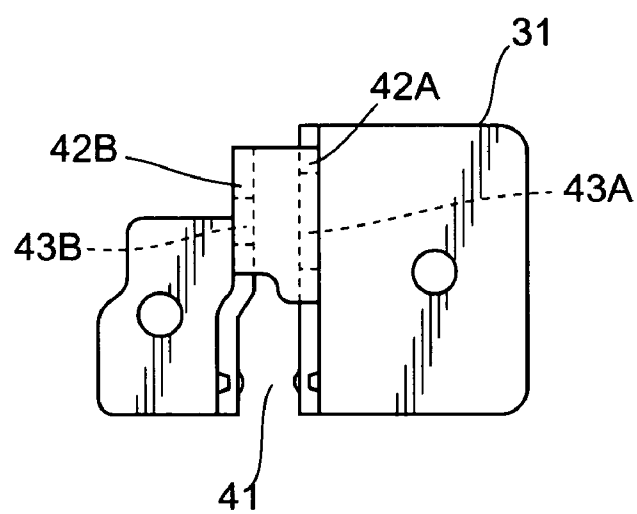
FIGS. 10(A) and 10(B) are schematic views showing front and side structures of a latch bracket, respectively.
Figure 10B:
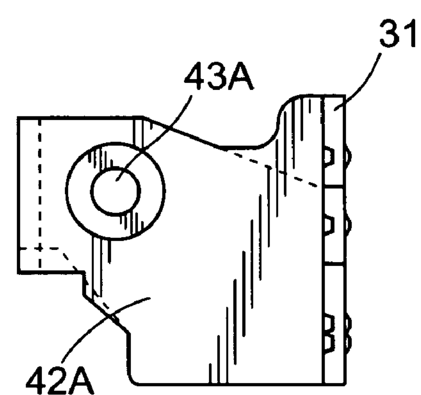

The aforesaid planar portion 35 of the pillar bearing 34 has the latch bracket 31 as shown in FIGS. 10(A) and (B), while the lock plate 26 is arranged at the opening 41 formed in the vicinity of the center of the latch bracket 31.

In a preferred form of the invention, the latch bracket 31 is formed with the side portions 42A and 42B that are formed by bending a tabular plate in a letter U shape in the vicinity of the center thereof so that they may be erected substantially vertically, with the aforesaid opening 41 being provided between these side portions 42A and 42B.

Figure 11:
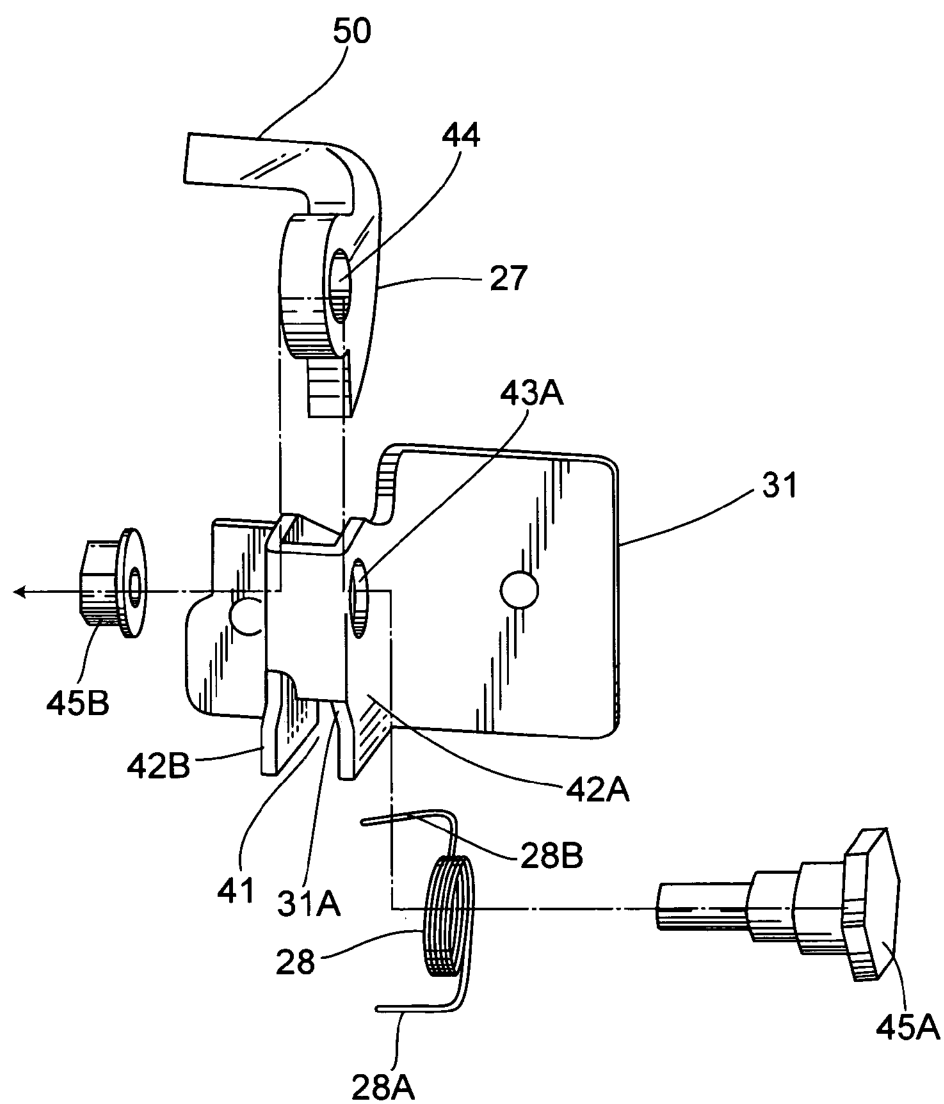
FIG. 11 is an exploded perspective view for explanation of relationship among the latch bracket, the latch and a torsion coil spring.

The latch bracket 31 has the through-holes 43A and 43B formed through the side portions 42A and 42B, respectively. As shown in FIG. 11, the latch 27 is arranged pivotably in the opening 41 between the side portions 42A and 42B, by tightening a nut 45B relative to a bolt inserted through the through-holes 43B of the side portion 42B through the through-hole 44 of the latch 27 from the through-hole 43A of the side portion 42A.

In addition, the latch bracket 31 is provided with the torsion coil spring 28 for use with the latch between the outside surface of the side portion 42A and the bolt 45A, having one end 28A thereof engaged with an engagement groove 31A of the one side portion 42A, and the other end 28B thereof fastened by a tabular press-up portion 50 formed in the upper portion of the latch 27, as shown in FIG. 8.

The torsion coil spring 28 for use with latch is constituted so that a load may be given in the direction which rewinds the torsion coil spring 28 so as to allow the projection 51 formed in the underside of the latch 27 to always abut to the lock plate 26.

Figure 12:
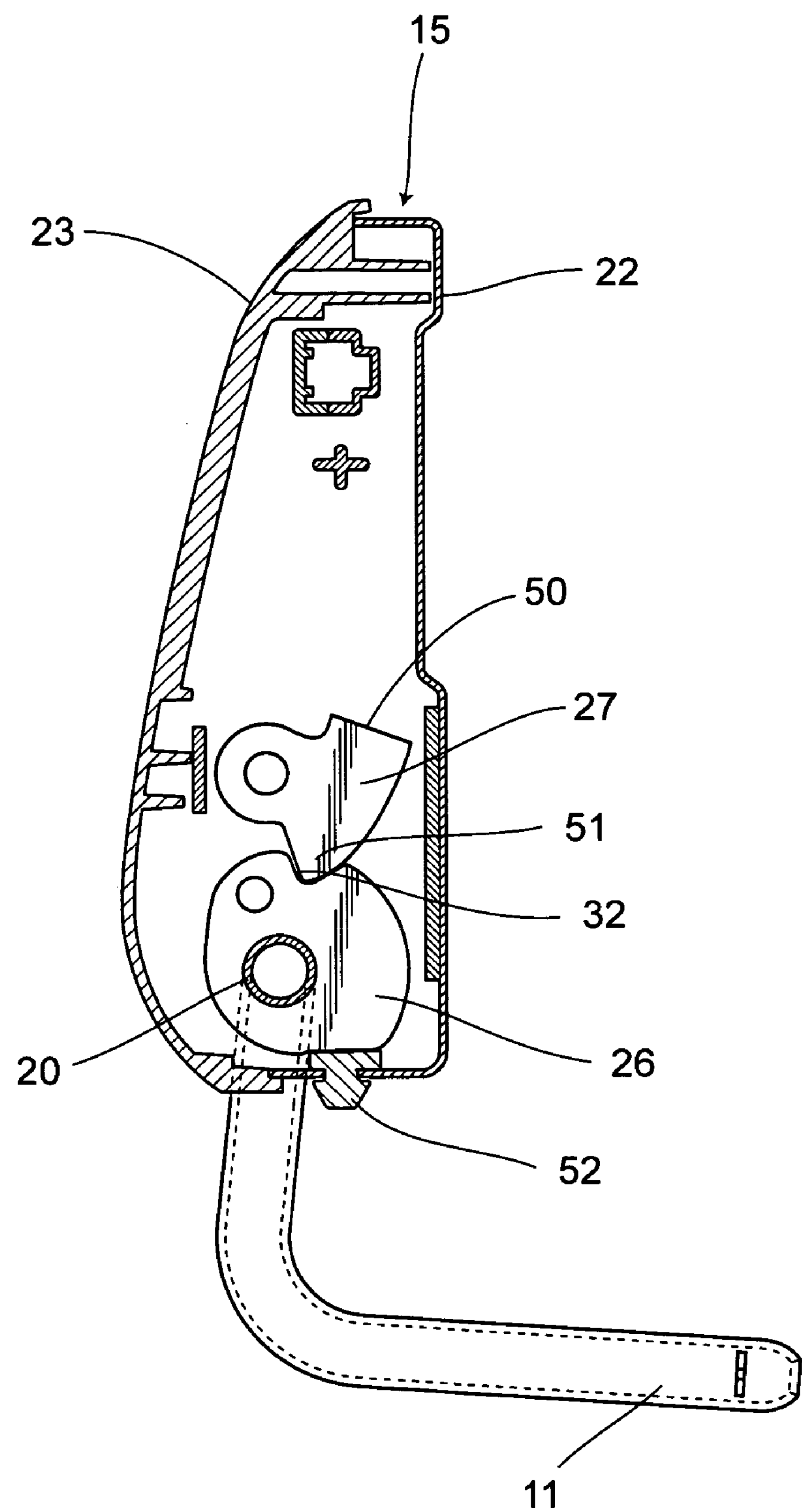
FIG. 12 is a schematic section showing the lock plate and the latch in a locked condition when the headrest is erected.

When the headrest body 7A is brought in an erected state in this way, the locking projection 51 of the latch 27 is fitted into the cutout 32 of the lock plate 26 in the latch bracket 31, as shown in FIG. 12, and thus the locking projection 51 is kept in a pressed state by the cutout 32 even if the load from the backward-retracting torsion coil spring 25 is given, so that the headrest body 7A can be held in a state erected substantially vertically.

According to the present embodiment, the lock plate stopper 52 made of a rubber member is provided in the interior lower side of the first casing 22, and thus when the headrest body 7A is in an erected state, the lower part of the lock plate 26 is allowed to abut to the upper surface of the lock plate stopper 52, thus ensuring the headrest body 7A to be held in an erected posture.

In the meantime, the first casing 22 has the actuator 29 arranged above the latch bracket 31, as shown in FIG. 7, and a tip of the rack 53 is protruded from the side part of the actuator 29.

The rack 53 is arranged horizontally so as to be substantially parallel with the horizontal shaft 20 of the pillar 11, having a circular engagement hole 54 at its distal end that is penetrated through the thickness thereof, so that a headed shaft 56 formed in the end 55A of the latch press-up arm 55 is inserted into the engagement hole 54 so that the rack 53 and the latch press-up arm 55 can be interlocked. In the meantime, the headed shaft 56 is formed with a widened head portion 57, thus enabling the headed shaft 56 from dropping out of the engagement hole 54 when the rack 53 and the latch press-up arm 55 are interlocked.

In a preferred form of the invention, the latch press-up arm 55 takes a substantially letter L shape, having a corner rotatably provided via the fixed shaft 58 in the first casing 22, with an end 55B thereof being, as illustrated in FIG. 8, arranged so that it is located in the undersurface (hereinafter called "press-up surface") 59 of the tabular press-up part 50 extending in the horizontal direction from an upper part of the opening 41 of the latch bracket 31.

Incidentally, there is provided another torsion coil spring 65 having one end fastened by the pillar bearing 34 and the other end fastened by the aforesaid latch press-up arm 55 so that an end 55A of the latch press-up arm 55 is always biased toward the actuator 29.

The actuator 29, as shown in FIG. 7, comprises the motor 60 having a rotation shaft arranged horizontally, a worm provided on the rotation shaft of the motor 60, a toothed gear 62 that engages with the worm 61 and the other end of the rack 53, a casing body 63 for housing these components, the latch press-up arm 55 moved in association with said rack 53 arranged outside said casing body 63 and a wiring 64 led from an outside of the headrest casing 15 and connected electrically with said motor 60.

Figure 13:
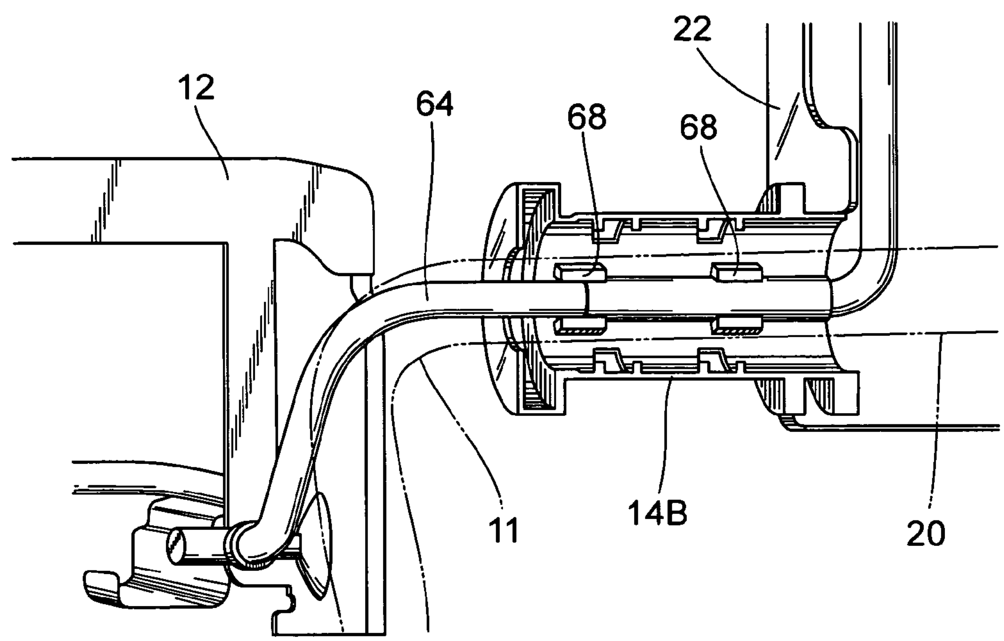
FIG. 13 is a schematic diagram showing an interior structure of a pillar cover.

The wiring 64 is connected with a power source of a vehicle, for example. The wiring 64 is then allowed to pass through a predetermined part and is drawn from the lower part of the seatback frame 12 to the upper part of the seatback frame 12, and finally drawn into the inside of the headrest casing 15 after passing through the inside of the pillar cover 14B together with the pillar 11, as shown in FIG. 13. Incidentally, the wiring 64 is held in place inside the pillar cover 14B by a retaining member 68.

With the structure thus made, said actuator 29 allows the motor 60 to be rotated positively momentarily and then reversely in response to a command from an operation switch (not shown), so that rotation driving force thus developed is transmitted to the tack 53 through the toothed gear 62, thus enabling said rack to be reciprocated in the horizontal direction momentarily.

Figure 14:
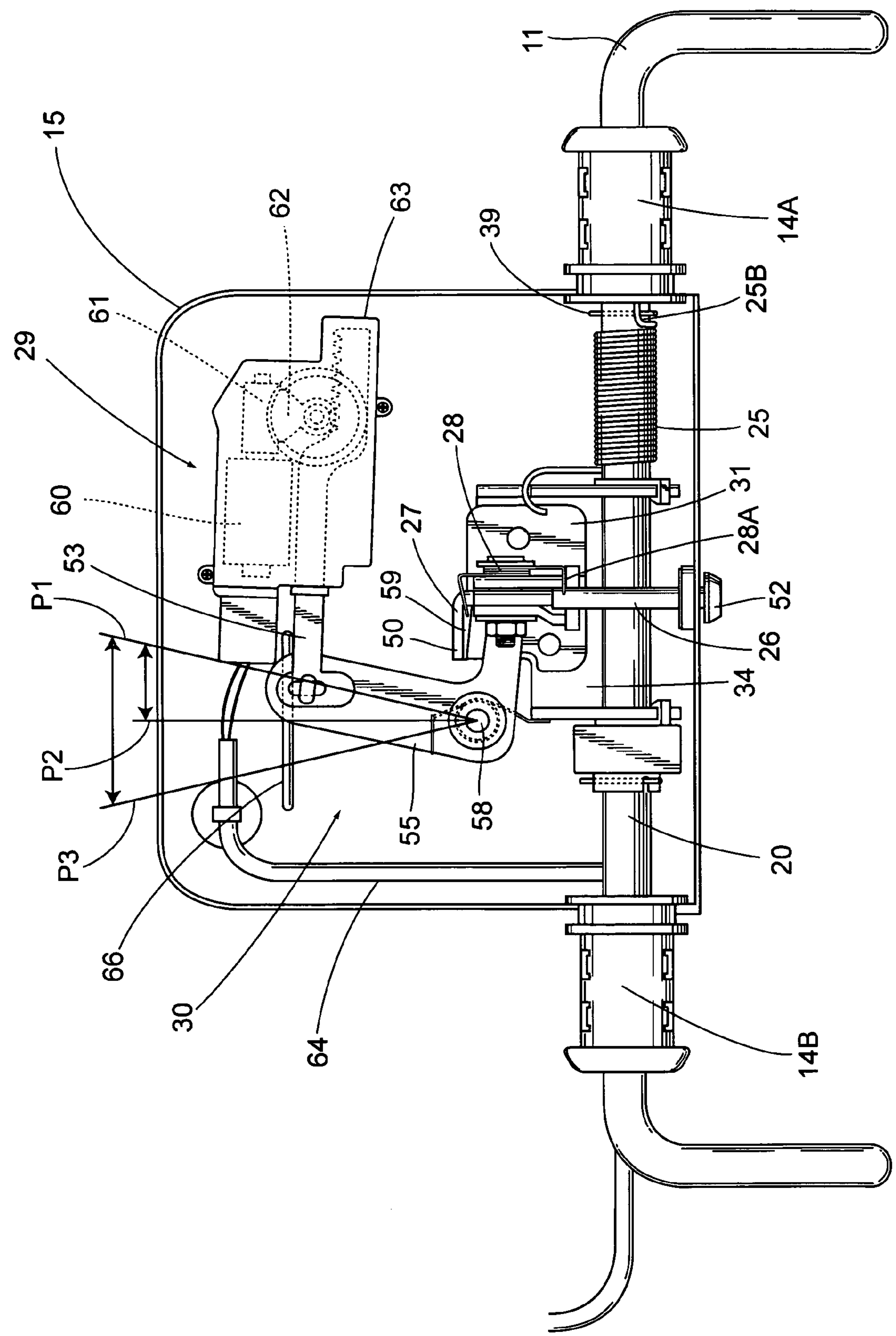
FIG. 14 is a schematic diagram illustrating a range of movement of a latch lifting arm.

As illustrated in FIG. 14, the actuator 29 is operated such that the rack 53 is normally drawn into the casing body 63, with the end of the rack 53 being situated in a normal position P1, while if the motor 60 is rotated positively, then rotation driving force is transmitted to the rack 53 through the worm 61 and the toothed gear 62, so that the rack 53 is moved in the horizontal direction in a manner like being pushed out from the casing body 63, thereby enabling the end of the latch press-up arm 55 to be moved from the aforesaid normal position P1 to a latch release position P3 through a latch contact position P2.

Figure 15:
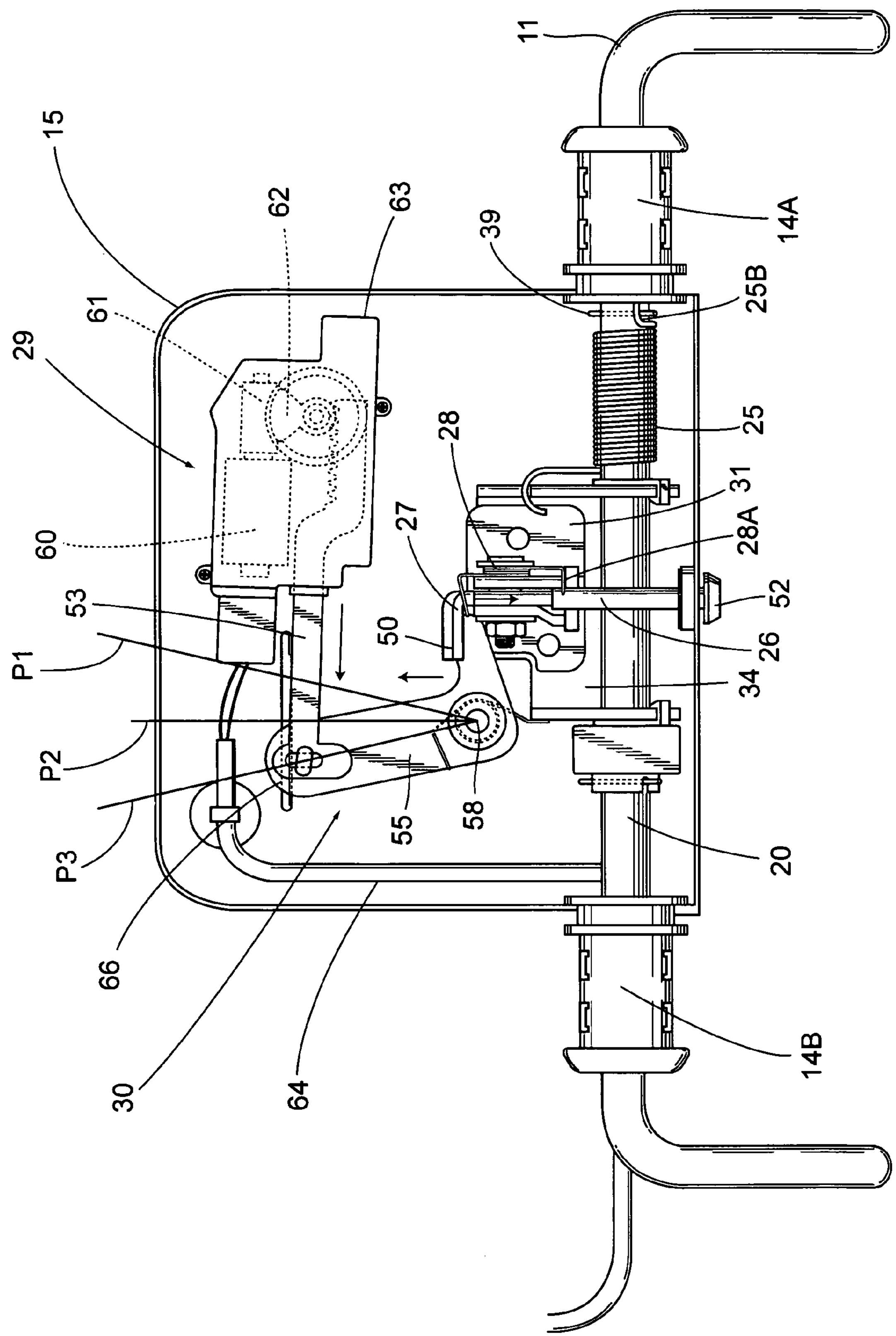
FIG. 15 is a schematic diagram illustrating the latch lifting arm at the farthest end.

At this moment, the latch press-up arm 55, as shown in FIG. 15, raises the other end 55B through the fixed axis 58*d* due to the one end being shifted from the normal position P1 to the latch release position P3, thereby allowing the other end 55B to press-up the press-up surface 59 of the latch 27.

Figure 16A:
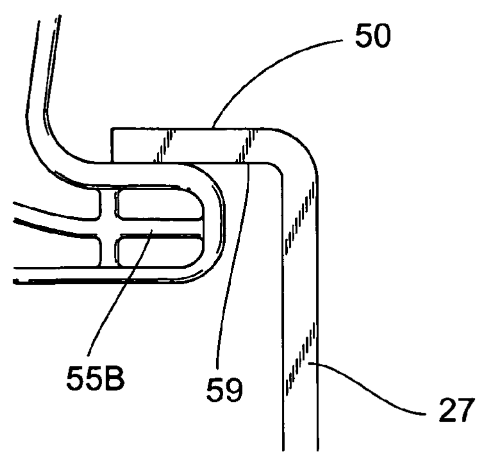
FIGS. 16(A) and 16(B) are explanatory schematic diagrams illustrating the latch lifting arm in the process of lifting a lifting surface.
Figure 16B:
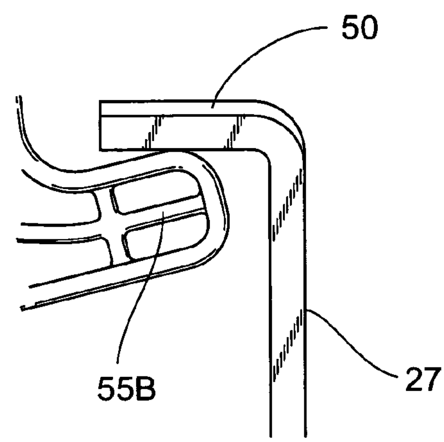
Figure 17:
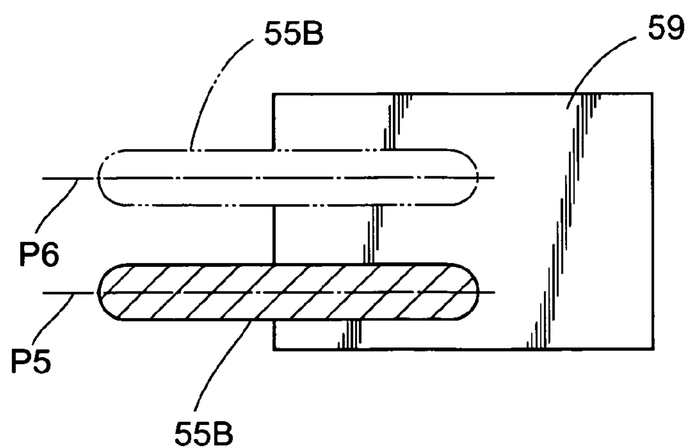
FIG. 17 is a schematic diagram illustrating a contact position where the latch lifting arm is allowed to contact a lifting surface at an other end.

Specifically, the other end 55B of the latch press-up arm 55 is allowed to contact a press-up start position P5 of the press-up surface 59 when the end 55A is in the latch contact position P2, as shown in FIGS. 16(A) and 17. Thereafter, when the end 55A is shifted from the latch contact position P2 to the latch release position P3, then it is moved to the press-up position P6 while being contacted by the press-up surface 59, as shown in FIGS. 16(B) and 17, and thus the press-up part 50 is pushed up accordingly.

Figure 18A:
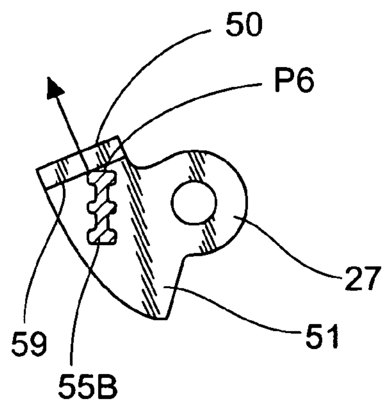
FIGS. 18(A) and 18(B) are explanatory schematic diagrams illustrating how the latch is rotated.
Figure 18B:
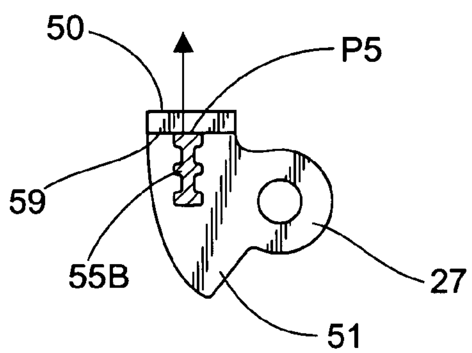

Accordingly, as shown in FIG. 18(A) and (B), the latch 27 is rotated around the axis of the bolt 45A due to the other end 55B of the latch press-up arm 55 is sifted from the press-up start position P5 to the press-up position P6, thus rotating the locking projection 51 upward as shown in FIG. 15, whereby the locking projection 51 fastened by the cutout 32 of the lock plate 26 is disengaged therefrom.

Figure 19:
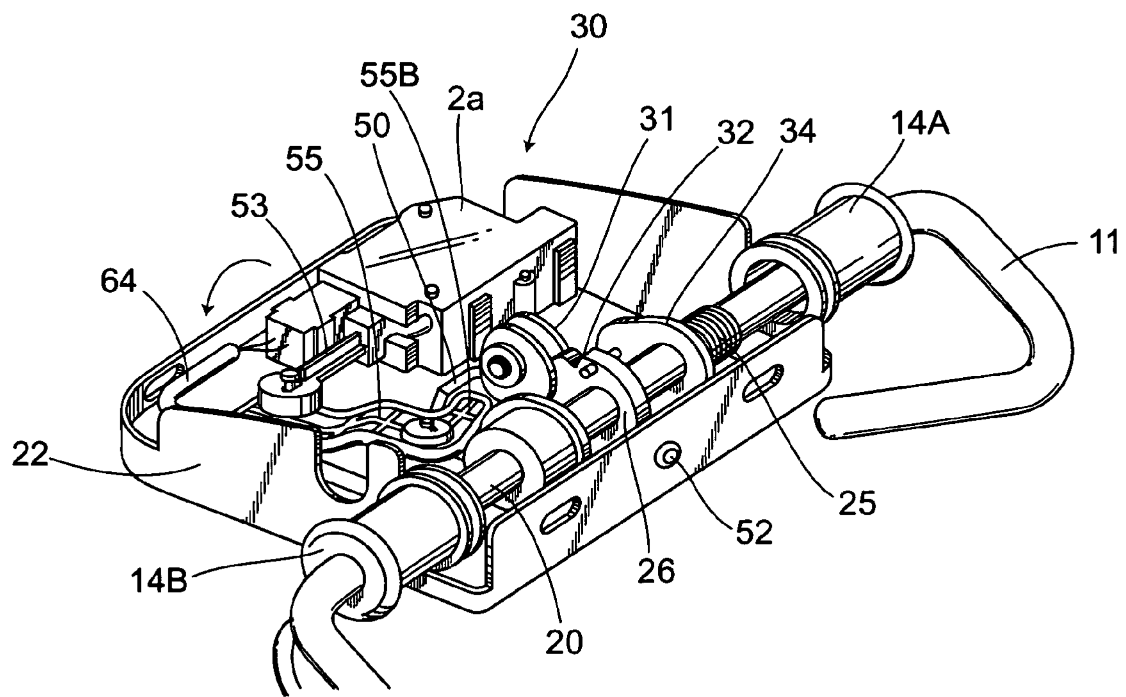
FIG. 19 is a schematic diagram showing an interior structure of the headrest casing that is retracted backward.

Thus, the first casing 22, as shown in FIG. 19, is allowed to be retracted backward about the horizontal shaft 20 serving as a rotating axis, due to the biasing force of the backward-retracting torsion coil spring 25 being transmitted through the pillar bearing 34.

Figure 20:
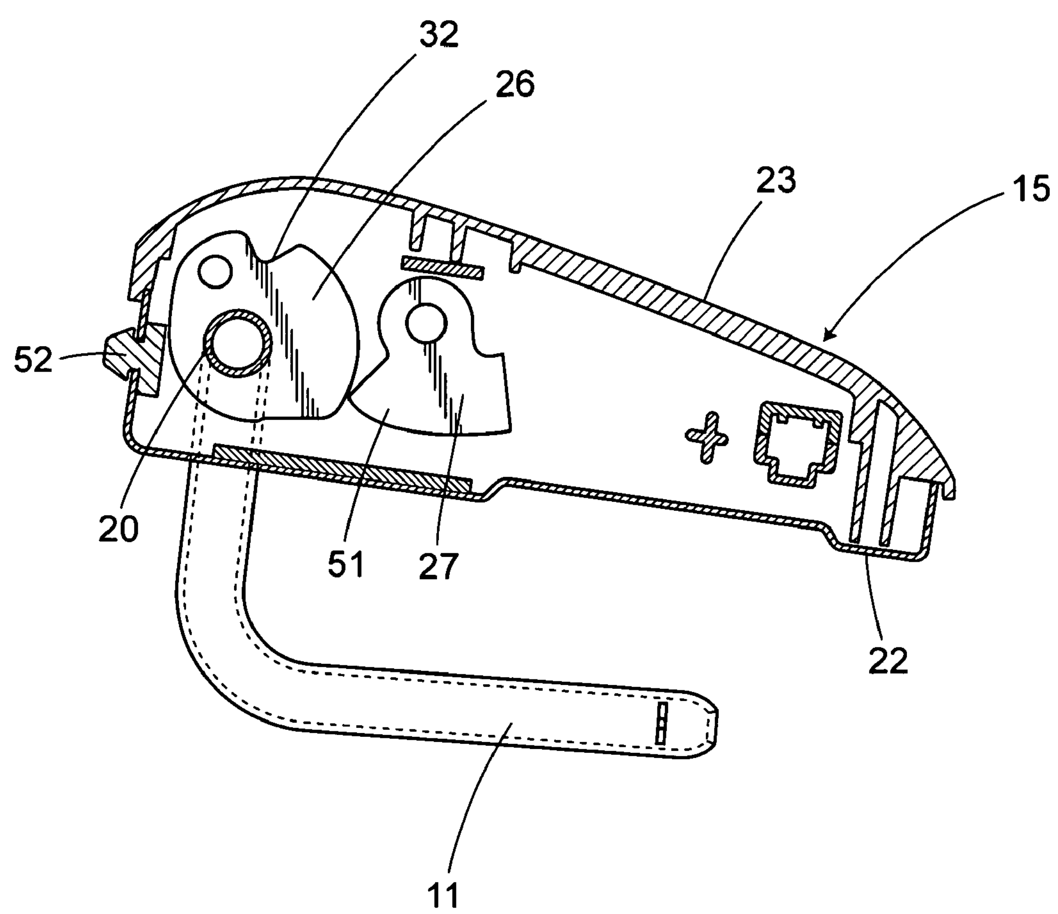
FIG. 20 is a schematic diagram showing the lock plate being disengaged from the latch when the headrest is retracted backward.

At this time, the latch 27 is rotated, as shown in FIG. 20, with the projection 51 of the latch 27 being always abutted to by the lock plate 26, due to the biasing force of the torsion coil spring 28 in association with the backward retracting of the first casing 22.

Figure 21:
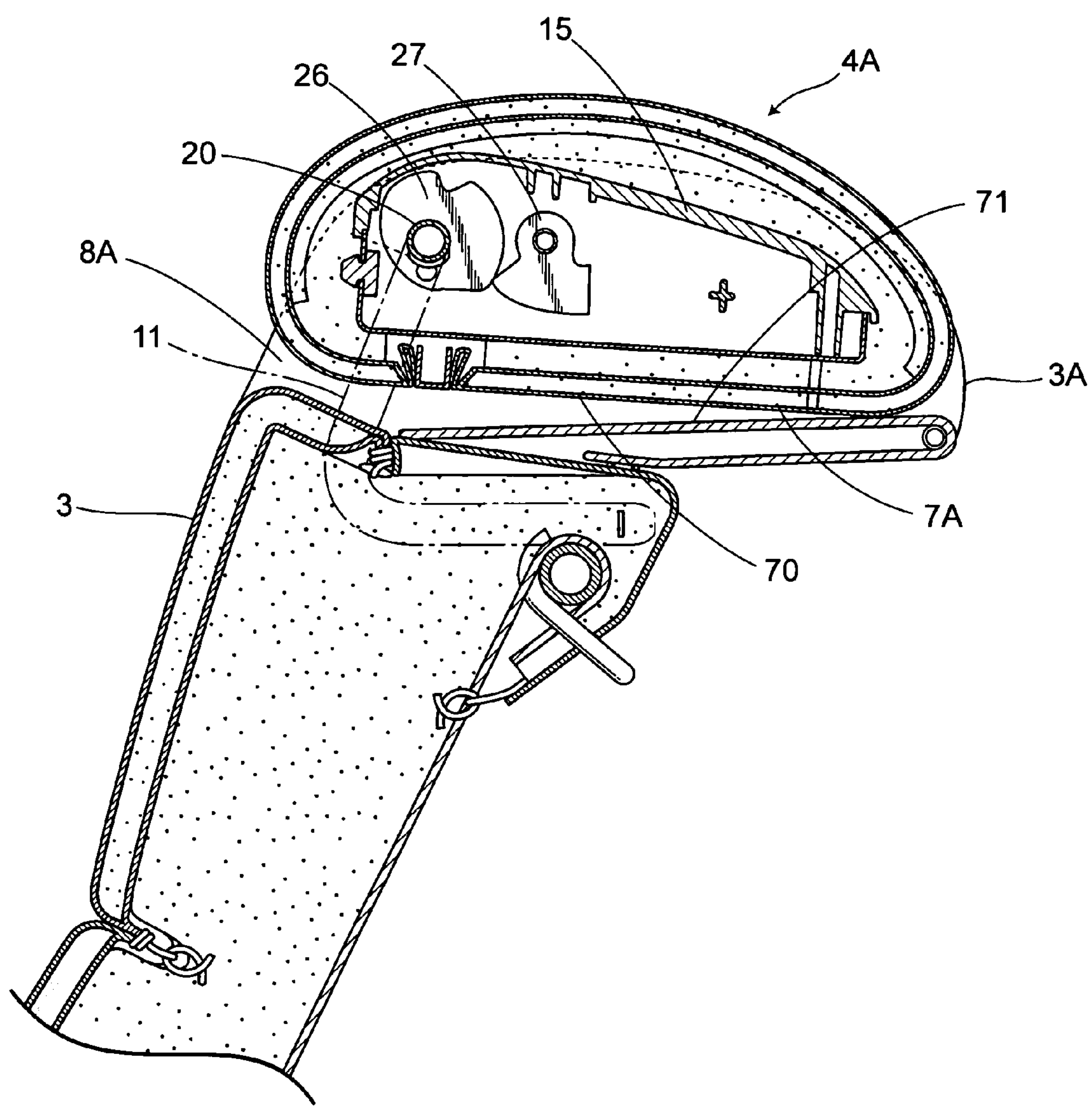
FIG. 21 is a schematic diagram showing the headrest body being retracted backward on the upper portion of the seatback.

Thus, the headrest body 7A, as shown in FIG. 21, is retracted backward until the rear surface 70 of the headrest body 7A is allowed to abut to the inside surface 71 of the concave portion 8A of the upper portion 3A of the seatback 3, whereby the front surface 9A thereof and the upper portion 3A of the back seat 3 are substantially aligned with each other to form a planar plane.

With the above-mentioned structure, in the case where the headrest body 7A in an erected state is retracted backward, the operation switch provided in the front panel, for example, is pressed by the passenger sitting on the front seat (not shown) so that the motor 60 inside the headrest casing 15 is allowed to rotate positively or reversely momentarily, so that the rack 53 is reciprocated to thereby lift or lower the other end of the latch press-up arm 55.

At this time, the latch 27 is rotated by pressing up the press-up portion 50 of the latch 27 by the other end of the latch lifting arm 55, while the engagement of the locking projection 51 with the cutout 32 of the lock plate 26 is released in response to the rotation of the latch 27.

Thus, the headrest body 7A can be retracted backward by the load that works in the direction for rewinding the backward-retracting torsion coil spring 25.

Thus, the headrest body 7A can be retracted backward reliably by the retracting mechanism 30 such as the actuator 29 and the backward-retracting torsion coil spring 25, provided inside the headrest body 7A. Accordingly, without the need to arrange varying components of the retracting mechanism 30 in the seatback 3 according to various shapes of the seatback 3, the headrest body 7A can be retracted backward by the motor 60 only by attaching the pillar 11 of the retractable headrest 4A to the upper portion 3A of the seatback 3 of various shapes, and connecting a power source to a wiring 64.

According to the foregoing embodiment, the headrest body 7A can be retracted backward with the posture being stabilized since the headrest body 7A is retracted backward by the backward-retracting torsion coil spring 25. Moreover, the motor 60 is allowed to rotate momentarily so as to release the engagement by the latch 27, the motor does not need to keep on rotating when the headrest body 7A is retracted backward, thereby realizing the reduction of power consumption as well as the lessening of drive sound.

Moreover, the motor 60 is provided inside the headrest body 7A such that the motor 60 is driven to rotate in response to the operation of the operation switch provided at the front seat side, whereby the headrest body 7A of the rear seat 1 can be retracted backward by remote control with a passenger sitting on the front seat.

Furthermore, when the headrest body 7A is retracted backward, then the headrest body 7A is accommodated into the concave portion 8A of the upper portion 3A of the seatback 3, whereby the upper portion of the seatback 3 is capable of being formed planar as a whole, thereby enabling the rearward visibility to be extended still further.

Moreover, since the upper portion of the seatback 3 can be formed almost planar in this way, the seatback 3 can be folded toward the front reliably in order to ensure a large space in a trunk room, without the headrest body 7A interfering with a front seat.

In the case where the headrest body 7A in a backwardly retracted state is brought into an elected state, the headrest body 7A is manually moved forward against the biasing force from the torsion coil spring 25 until it is erected substantially vertically. At that moment, the locking projection 51 of the latch 27 is moved, in association with the forward movement of the headrest body 7A, while being brought into a sliding contact with the lock pate 26, due to the biasing force by the torsion coil spring 28, so that the locking projection 51 is fitted into the cutout 32 when passing through the cutout 32 of the lock pate 26, thereby enabling the headrest body 7A to be kept in an erected state.

Thus way, when the headrest body 7A is in an erected state, the front surface 3B of the seatback 3B and the front surface 9A of the headrest body 7A can be substantially aligned with each other, and thus the rear side of the head of a passenger on the rear seat 1 can be supported entirely and reliably.

According to the present embodiment, the headrest body 7A is folded forward until it is erected substantially vertically, when the lower portion of the lock plate 26 is allowed to contact the upper surface of the lock plate stopper 52, at the same time that the stopper 33 of the lock plate 26 is allowed to abut to the side surface of the latch bracket 31, thereby regulating the rotation of the headrest body 7A, to thereby make it possible to present the damage of the backward-retracting torsion coil spring 25 due to too much load imposed to the headrest body 7A.

Moreover, the horizontal shaft 20 of the pillar 11 is protruded from the sides of the headrest body 7A, while in the upper portion 3A of the seatback 3, both ends 21A and 21B of the pillar 11 are attached to the seatback frame 12 through the opposite sides 13A and 13B of the concave portion 8A, and thus the pillar 11 that supports the headrest body 7A can be concealed entirely.

Moreover, in the rear seat 1, the pillar 11 is not exposed and thus a cushion pad can be arranged in all the parts that a rear side of a passenger's head can contact.

In addition, since the rear surface of the headrest body 7A is not formed with any hole that can expose the pillar 11 to the outside, introduction of dusts from the outside can be prevented, thus eventually enabling the retracting mechanism 30 to be prevented from breaking down due to dust or the like.

Incidentally, in the present embodiment, the first casing 22 is formed with an oval hole 66 formed along a track which the end of the latch press-up arm 55 traces in moving from the normal position P1 to the latch release position P3. A rod member (not shown) may be inserted from the oval hole 66 in order to forcedly shift the end of the latch press-up arm 55, thereby enabling the headrest body 7A to be kept in a retracted or erected posture even in the case that the motor fails to operate properly.

As mentioned above, according to the present embodiment, since all the components of the retracting mechanism 30 for retracting the headrest body 7A are provided inside the headrest body 7A, any additional component does not need to be provided inside the seatback 3. Accordingly, even if the seatback 3 can take various forms according to the type of a vehicle, yet the headrest body 7A can be made retractable by the actuator 29 simply by attaching the headrest 7A to the upper portion 3A of the seatback 3, using the pillar 11. Thus way, there can be provided the retractable headrest 4A for vehicle with a high versatility.

Moreover, the motor 60 is rotated in response to the command from the operation switch to thereby release the engagement of the latch 27 in the present embodiment, whereby the headrest body 7A can be retracted backward by remote control from the operation switch, without a passenger touching the headrest body 7A directly. Accordingly, range of vision can be extended easily, thus enabling the improvement of security reliably and easily.

Furthermore, the headrest body 7A is arranged in the concave portion formed in the upper portion 3A of the seatback 3, and the horizontal shaft 20 is fitted via both sides 10A and 10B of the headrest body 7A through the opposite side surfaces 13A, 13B of the concave portion 8A to the seatback frame 12. Thus way, the pillar 11 that supports the headrest body 7A can be hidden so as to be made invisible. As a result, the unity between the seatback 3 and the headrest body 7A can be realized such that the headrest body 7A, though it is provided with the retracting mechanism 30, looks as if it were an ordinary headrest body that is normally attached to the seatback. Moreover, since the headrest body 7A is arranged in the concave portion 8A, a cushion pad can be arranged in any part contacted by a back of the passenger's head, thus enabling the provision of the rear seat 1 that is easy for the passenger to take to even when there is provided the retractable headrest 4A for vehicle.

Furthermore, when the headrest body 7A is accommodated into the concave portion 8A, then the upper portion of the headrest body 7A is substantially aligned with the upper portion 3A of the seatback 3, so that the seatback 3 is allowed to have a substantially planar upper surface, whereby a back field of view can be extended still further. Moreover, since the seatback is allowed to have such a planar upper surface this way, the headrest body 7A can be prevented from interfering with a front seat when folding the seatback 3 toward the front, In addition, a troublesome attachment-and-detachment work, such as the folding of the seatback toward the front after removing the headrest 7A, can also be saved, thus improving the user-friendliness thereof.

Although the actuator according to the foregoing embodiment is structured such that the other end 55B of the latch lifting arm 55 is pressingly lifted by the rotation of the motor 60 to thereby release the engagement of the latch 27, this is only an example of various applicable cases. For example, as shown in FIG. 22 where the same portions as those illustrated in FIG. 7 are designated by the same reference numerals, there may be provided an actuator 102 comprising a shaft 100, a button 101 and the latch lifting arm 55 instead of the above actuator 29 equipped with the motor 60, so that the other end 55B of the latch lifting arm 55 is pressingly lifted up by pressing the button 101 downward, to thereby release the engagement of the latch 27.

Figure 22:
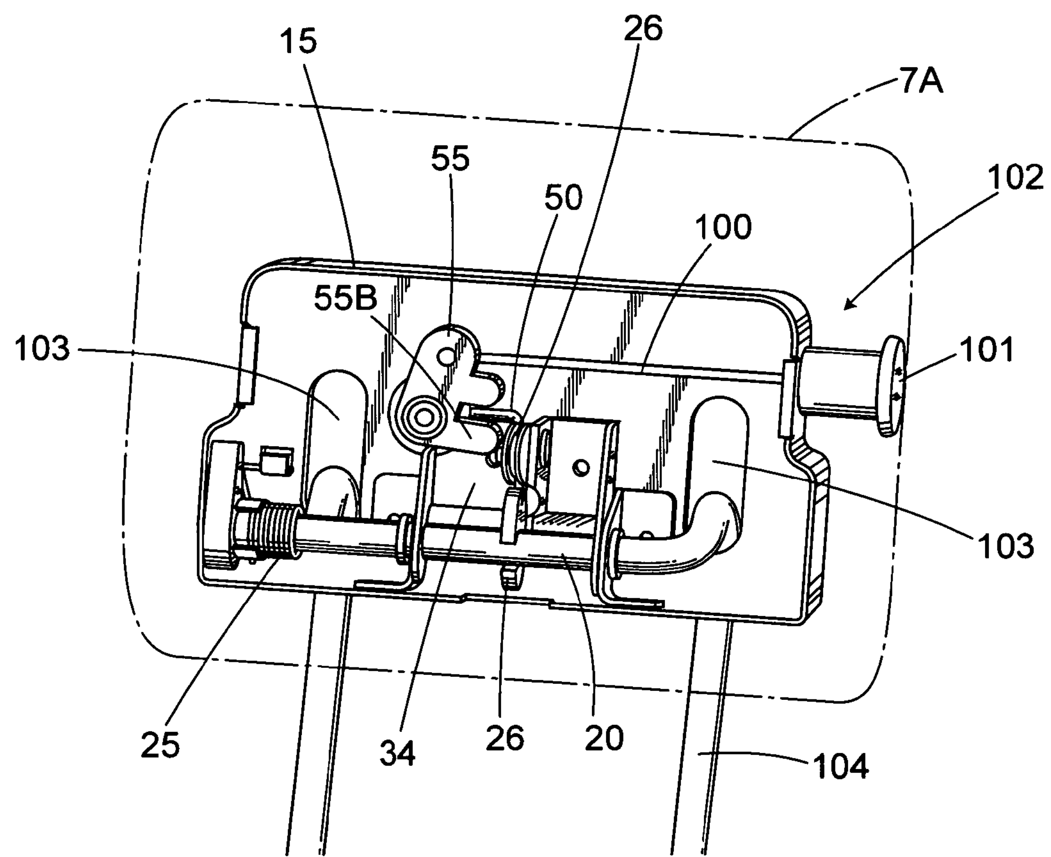
FIG. 22 is a schematic diagram showing an interior structure of the retractable headrest for vehicle in accordance with another embodiment of the invention.

Alternatively, whilst the pillar is allowed to protrude from the sides of the headrest body in the above-mentioned embodiment, the present invention should not be limited thereto, but a pillar 104, as illustrated in FIG. 22, for example, may be allowed to protrude from a protruding hole 103 provided on a rear surface of the headrest body 7A. Still alternatively, the pillar may be protruded from a bottom.

Furthermore, whilst there are provided the concave cutout 32 serving as the first locking part and the convex locking projection 51 serving as the second locking part in the foregoing embodiment, the convex locking projection may be the first locking part while the concave cutout may be the second locking part.

What is claimed is:

1. A retractable headrest for vehicle including a pillar having a horizontal shaft, said pillar being provided in an upper portion of a seatback; a headrest body having a lower portion rotatably provided around said horizontal shaft of said pillar; and a retracting mechanism provided inside said headrest body for retracting said headrest body backward, said retracting mechanism comprising:

- a headrest body biasing means for biasing an upper portion of said headrest body backward;
- a lock plate provided on the horizontal shaft of said pillar, said lock plate having a first locking part;
- a latch provided in said headrest body, said latch having a second locking part engageable with said first locking part;
- a latch biasing means for biasing said latch so as to engage said second locking part with the first locking part of said lock plate when said headrest body is erected in a substantially vertical state;
- an actuator for disengaging the second locking part of said latch from the first locking part of said lock plate against a basing force from said latch biasing means;
- wherein said headrest body is retracted backward by disengaging the second locking part from the first locking part of said lock plate, and is kept in a backwardly retracted state by abutting the rear surface of said headrest body against the upper portion of said seatback.

2. The retractable headrest for vehicle according to claim 1, wherein said actuator comprises:

- a motor driven in response to a command from an operation part;
- a rack to which a driving force from said motor is transmitted; and
- an arm for disengaging the second locking part of said latch from the first locking part of said lock plate in response to a sliding action of said rack.

3. The retractable headrest for vehicle according to claim 2, wherein said headrest body is arranged in a concave portion formed in an upper portion of said seatback, while said pillar allows said horizontal shaft to protrude from the sides of said headrest body, extending through opposite surfaces of said concave portion and attached to a seatback frame provided inside seat seatback.

4. The retractable headrest for vehicle according to claim 3, wherein said headrest body is accommodated into said concave portion by being retracted backward such that the upper portion of said headrest body is substantially aligned with the upper portion of said seatback.

5. The retractable headrest for vehicle according to claim 2, wherein said seatback is a rear seat while said operation part is provided on a front seat side.

6. The retractable headrest for vehicle according to claim 2, wherein said headrest biasing means is a backward-retracting torsion coil spring, while said actuator drives said motor to rotate slightly so as to disengage the second locking part of said latch from the first locking part of said lock plate so that said headrest body is retracted backward by a basing force from said backward-retracting torsion coil spring.

7. The retractable headrest for vehicle according to claim 2, wherein said latch is rotatably provided in said latch bracket, with said actuator being arranged above said latch bracket.

8. The retractable headrest for vehicle according to claim 7, wherein said rack is arranged horizontally so as to be substantially parallel with the horizontal shaft of said pillar, having an engagement through-hole at a distal end, while said arm takes a substantially letter L shape, having a corner rotatably provided, said arm having a headed shaft on one end thereof to be inserted into said engagement hole of said rack to work in association with said rack, while an other end thereof being arranged in an undersurface of a press-up part of said latch bracket.

9. The retractable headrest for vehicle according to claim 8, wherein said actuator allows said motor to be rotated positively momentarily and then reversely, so that said rack is reciprocated to thereby lift or lower the other end of said arm, while said latch is rotated by lifting the press-up portion of said latch by the other end of said arm, to thereby disengage the second locking part from the first locking part of said lock plate in response to the rotation of said latch.

10. The retractable headrest for vehicle according to claim 1, wherein said headrest body is arranged in a concave portion formed in an upper portion of said seatback, while said pillar allows said horizontal shaft to protrude from the sides of said headrest body, extending through opposite surfaces of said concave portion and attached to a seatback frame provided inside seat seatback.

11. The retractable headrest for vehicle according to claim 10, wherein said headrest body is accommodated into said concave portion by being retracted backward such that the upper portion of said headrest body is substantially aligned with the upper portion of said seatback.

12. The retractable headrest for vehicle according to claim 1, wherein said headrest body comprises a first casing rotatably provided around said horizontal shaft and a second casing that is fitted into said first casing, and wherein a lock plate stopper made of a rubber member is provided in an interior lower side of said first casing so that when said headrest body is in an erected state, a lower part of said lock plate is allowed to abut to an upper surface of said lock plate stopper.

13. The retractable headrest for vehicle according to claim 1, wherein said latch is rotatably provided in said latch bracket, while said lock plate comprises a stopper so that a positive rotation of said headrest body is regulated by said stopper abutting to said latch bracket when said headrest body is in an erected state.

14. The retractable headrest for vehicle according to claim 1, wherein said headrest biasing means is a backward-retracting torsion coil spring, biasing said headrest body backward.

15. A retractable headrest for vehicle including a pillar having a horizontal shaft, said pillar being provided in an upper portion of a seatback; a headrest body having a lower portion rotatably provided around said horizontal shaft of said pillar; and a retracting mechanism provided inside said headrest body for retracting said headrest body backward, said retracting mechanism comprising:

- a headrest body biasing means for biasing an upper portion of said headrest body backward;
- a lock plate provided on the horizontal shaft of said pillar, said lock plate having a first locking part;
- a latch provided in said headrest body, said latch having a second locking part engageable with said first locking part;
- a latch biasing means for biasing said latch so as to engage said second locking part with the first locking part of said lock plate when said headrest body is erected in a substantially vertical state; and
- an actuator for disengaging the second locking part of said latch from the first locking part of said lock plate against a basing force from said latch biasing means,
- wherein said actuator comprises:
  - a motor driven in response to a command from an operation part;
  - a rack to which a driving force from said motor is transmitted; and
  - an arm for disengaging the second locking part of said latch from the first locking part of said lock plate in response to a sliding action of said rack,
- wherein said latch is rotatably provided in said latch bracket, with said actuator being arranged above said latch bracket, and
- wherein said rack is arranged horizontally so as to be substantially parallel with the horizontal shaft of said pillar, having an engagement through-hole at a distal end, while said arm takes a substantially letter L shape, having a corner rotatably provided, said arm having a headed shaft on one end thereof to be inserted into said engagement hole of said rack to work in association with said rack, while an other end thereof being arranged in an undersurface of a press-up part of said latch bracket.

16. The retractable headrest for vehicle according to claim 15, wherein said actuator allows said motor to be rotated positively momentarily and then reversely, so that said rack is reciprocated to thereby lift or lower the other end of said arm, while said latch is rotated by lifting the press-up portion of said latch by the other end of said arm, to thereby disengage the second locking part from the first locking part of said lock plate in response to the rotation of said latch.

* * * * *